United States Patent [19]

Regan

[11] Patent Number: 4,997,312

[45] Date of Patent: Mar. 5, 1991

[54] WATER BACKUP PREVENTING SYSTEM AND MONITORING SYSTEM THEREFOR

[76] Inventor: Patrick Regan, 2923 N. Natchez Ave., Chicago, Ill. 60634

[21] Appl. No.: 462,105

[22] Filed: Jan. 8, 1990

Related U.S. Application Data

[62] Division of Ser. No. 215,545, Jul. 5, 1988, Pat. No. 4,892,440.

[51] Int. Cl.⁵ .......................... E02F 1/00; E02B 11/00
[52] U.S. Cl. .................................. 405/37; 137/236.1; 405/36; 405/43
[58] Field of Search .................. 405/36, 37, 40, 43, 405/45, 39, 52; 210/170; 137/236.1; 73/302

[56] References Cited

U.S. PATENT DOCUMENTS

| | | | |
|---|---|---|---|
| 1,221,251 | 4/1917 | Weinhold | 137/236.1 X |
| 3,229,707 | 1/1966 | Suchan | 137/236.1 |
| 3,626,823 | 12/1971 | Toth | 405/36 X |
| 3,727,459 | 4/1973 | Buettner | 73/302 X |
| 3,919,848 | 11/1975 | Sullivan | 405/43 |
| 4,150,683 | 4/1979 | Simon | 137/236.1 X |
| 4,162,976 | 7/1979 | Monson | 210/170 |
| 4,245,664 | 1/1981 | Johnson | 137/236.1 |
| 4,272,640 | 6/1981 | Baumbach | 137/110 |
| 4,407,159 | 10/1983 | Wytaniec | 73/302 X |
| 4,457,646 | 7/1984 | Laesch | 405/36 X |
| 4,474,054 | 10/1984 | Ainlay | 73/302 X |

Primary Examiner—Dennis L. Taylor
Attorney, Agent, or Firm—Russell E. Hattis; Stephen R. Arnold

[57] ABSTRACT

A water backup monitoring system for a buried sewer line is provided, the sewer line being provided at a given point therealong with at least one overflow opening into which opening water which cannot be handled by the sewer line will rise and overflow. A manhole extends between the sewer line and the surface and surrounding said overflow opening to permit a man to gain access to the area of said overflow opening. A standpipe in the manhole communicates with the overflow opening, into which standpipe water rises when backflow conditions exist in the sewer line. A backflow-indicating tube is provided outside of this standpipe, and into which backflow water flows from the overflow opening so that the water in the backflow-indicating tube and the standpipe are at the same level. The tube provides an indication of the level of the water therein. A one-way valve in the tube permits water to rise in the tube, but prevents it from draining therefrom. When flow conditions abate and water drains from the standpipe, a permanent record remains in the tube of the level to which the water rose in the standpipe.

6 Claims, 4 Drawing Sheets ns or lakes are usually not feasible. Moreover, recently it has been discovered that such drainage ponds and lakes have created drinking water contamination problems if the area obtains its drinking water from underground# WATER BACKUP PREVENTING SYSTEM AND MONITORING SYSTEM THEREFOR This is a divisional of copending application Ser. No. 07/215,545, filed on July 5, 1988, now U.S. Pat. No. 4,892,440.

DESCRIPTION

This invention relates to a unique water backup monitoring system useful separately but preferably with a unique water backup preventing system also disclosed herein.

BACKGROUND OF PRIOR ART

The problem of basement flooding from sewer line water backup has become prevalent in recent years. This backup problem obviously occurs when the flow capacity of a sewer system is exceeded by the rain water in-flow rate into the system. The risk of water backup is present in most storm sewer systems where the storm sewers are rarely of a sufficient size to accommodate unusually heavy rainstorms. This risk is sometimes present in a sanitary sewer system leakage into the sewer line through manholes, leakage into the sewer line through manholes where improper roof downspout connections are made to the system which normally should only carry the water and sewage draining from sinks, toilets, washing machine drain lines and basement floor drains.

Backup problems in sanitary sewer lines leading to an individual home can be substantially eliminated by the application of a back flow preventing valve in the pipeline extending between the home and the underground sanitary sewer line running along the street involved. When backup water pressure builds up, the back flow preventing valve is closed or closes to prevent the water in the sanitary sewer line from backing up into the user's home. Of course, the downspouts of the user's home where such a backup valve is installed must not be connected to the pipe leading to the sanitary sewer or else the owner's own downspout rain water would create a backup problem in the owner's home. However, many home owners simply do not wish to incur or cannot afford the cost of such a backflow preventing valve installation.

Most homes have drain tile at their foundation footings and outside drains which collect rain water directed through pipes leading to the storm sewer line running underground along the street involved. A backflow preventing valve placed in the pipeline leading from the street storm sewer line to these rain water collection points of a home would not alleviate a basement flooding hazard because the water collected in these drain tiles and outside drains would build up behind a closed backflow preventing valve to cause a flooding problem.

To minimize backup problems from a storm sewer system, a number of expensive methods have been heretofore proposed. Where there are adequate spaces and tax revenues available for doing so, water drainage ponds and lakes have been constructed to collect excess rain water run-off before the water can gain direct access to the storm sewer system. Such drainage ponds or lakes are usually not feasible. Moreover, recently it has been discovered that such drainage ponds and lakes have created drinking water contamination problems if the area obtains its drinking water from underground wells or streams into which the water in the drainage ponds and lakes can drain.

Storm sewer backup can also obviously be minimized by increasing the size of the storm sewers making up a citywide storm sewer system. However, this is obviously an extremely expensive and usually impractical solution to the problem, unless the storm sewer system has to be replaced for other reasons.

The present invention in its most useful form presents a unique water backup monitoring system which informs a city inspector or home owner that backup has occurred at a given location, even when the backup has abated before the inspector or home owner has inspected the monitoring equipment involved.

SUMMARY OF THE INVENTION

The present invention involves both broad and specific aspects. Thus, while in its most practical and ideal form it encompasses the many specific features to be described and claimed, its most basis aspect involves a unique modification of and addition to a small section of sewer line which collects rain water from an area which can encompass many blocks along which the homes to be protected are located. For example, at a point where a branch sanitary or storm sewer line joins a main or interceptor sanitary or storm sewer line, and/or at one or more points along the main or interceptor sewer line, a small section of the sewer line is interrupted or modified to provide a water overflow opening at the top thereof. This overflow opening drains into one or more storage tanks located preferably just below the level of the bottom of the sewer line section involved or a large underground water storage cavern with walls made of concrete or other suitable material. A pump is provided at the bottom of one of the storage tanks or cavern and a pump control system is provided which automatically operates the pump to empty the water storage area involved only when such overflow water conditions abate. The manner and timing of the filling of these water storage areas is also an important specific aspect to the invention to be described.

Where a storage tank is used to hold the overflow water, it can be a conventional gasoline storage tank used in gas stations. A typical gasoline storage tank has a diameter of from 12 to 15 feet and a length of approximately 20 feet and can store 25,000 gallons of storm water. There could also be one or more very large diameter interceptor sewer line sections many feet in diameter (as compared to the much smaller sewer line sections under the street involved) and closed off at their ends by closure caps to form a storage tank. The storage tank capacity of a given backflow preventing installation can be increased by merely removing one of the end caps, adding one or more other sewer line sections, and then capping the outer sections.

These tanks can be installed under the street or within the usual city easement lines and arranged end-to-end along a line running beneath the level and parallel to the sewer line section involved. A desired storage tank volume can be computed from rain flow data of the city or area involved. When more than one tank is desired, the bottom portions of adjacent tanks are interconnected by a pipe extending between the bottom portions thereof. Ideally, a storage tank capacity is selected which can accommodate the full overflow water capacity required for the heaviest rainstorm recorded for the area involved. However, cost limitations for a storm sewer line may require that less than the ideal storage tank capacity be provided. The risk of backup can nevertheless be greatly reduced at a modest cost when the present invention is installed. Some of the specific aspects of the invention will accommodate rainstorms of a modestly more severe extent than the storage capacity of the storage tanks can accommodate.

In accordance with a preferred specific aspect of the invention, there is provided between ground level and a sewer line section a manhole which preferably extends all the way down to the top level of the sewer line. Generally, the sewer line is below the level of the deepest basement in the area involved, such as 5 feet below basement grade. The bottom of the manhole opens into an interrupted section of the sewer line where a backflow preventing valve is preferably installed in the sewer line downstream from the overflow opening. This backflow preventing valve is closed or closes when the sewer line cannot accommodate a heavy flow of water involved. Any continuing flow of water on the upstream side of a closed valve will cause water to build up behind the valve where it ultimately flows into the overflow opening. Water flowing into this opening preferably initially is directed to a standpoint inserted into this opening or into the manhole. When the water level in the standpipe or manhole approaches the deepest basement level in the area, the water is carried by a drain pipe to a water storage area involved to prevent flooding as claimed and described in said patent application Ser. No. 215,545, filed on July 5, 1988 and to be described hereafter.

The subject matter of the present divisional application deals with a monitoring system preferably used with the backflow preventing system just described and as claimed in parent application Ser. No. 215,545. The standpipe, or manhole if there is no standpipe, is provided with a backflow condition indicating tube. The tube is vertically oriented and has a one-way valve at the bottom thereof so that as water rises in the standpipe or manhole, it also will rise up in this tube and will remain there until released by the operator.

Whenever there is a backup condition in the system causing the backflow preventing valve unit to close the sewer line section involved, further buildup of water behind the closed valve will cause water to flow upwardly into the standpipe or manhole. Water will also rise in the tube to the same level as the water will be in the standpipe or manhole. When backflow conditions subside, the water will drain from the standpipe or manhole, but the water will remain in the backflow indicating tube. This is a record of the fact that pipe flow conditions occurred in the system, and this record is kept even though the water might not rise high enough in the standpipe or manhole to flow through the drain pipe extending into the storage tank. Indicating means are preferably provided to alert persons at ground level that a backflow condition has occurred.

DESCRIPTION OF EXEMPLARY FORM OF THE INVENTION SHOWN IN THE DRAWINGS

Figures 1, 2, 4B, 5, 6:
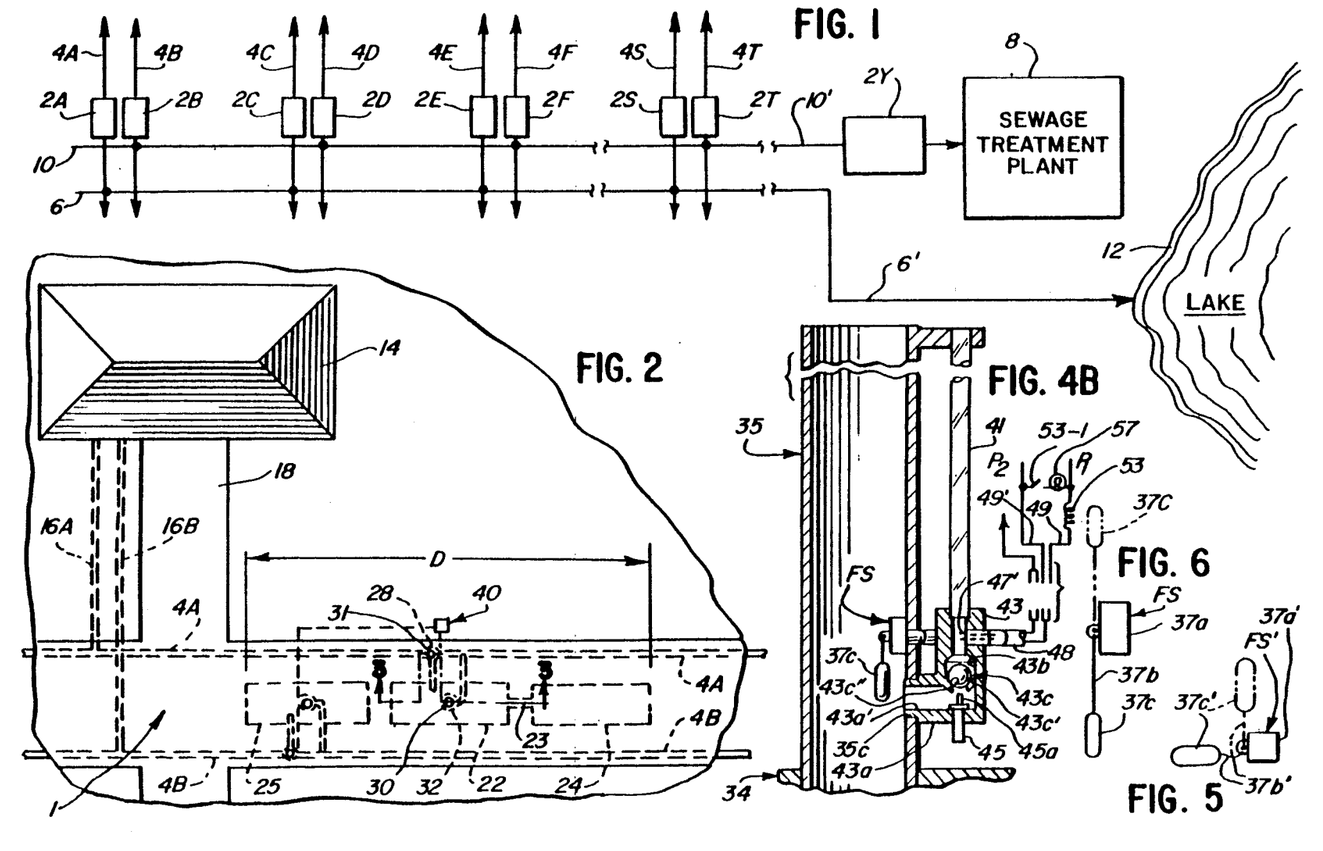
FIG. 1 is a diagram identifying by lines various storm and sanitary sewer lines throughout a city-wide area, and identifying by unmarked boxes various points of the sewer system where a backup water control system of the present invention are installed.
FIG. 2 is a fragmentary plan view of that portion of a street where a backup water control system of the present invention has been installed both in a storm sewer line and a sanitary sewer line extending beneath the opposite sides of the street thereshown.
FIG. 4B is an enlarged vertical sectional view through the standpipe shown in the bottom portion of the manhole of FIG. 3.
FIG. 5 is a view which shows in solid lines the position of a float ball portion of a float switch in the bottom of a storage tank of FIG. 3, when there is no water in the tank, the float ball having switch contacts therein which are then open, and shows in dashed lines the position of the float ball when there is water in the storage tank and the switch contacts are closed.
FIG. 6 is a view showing another float switch shown in FIGS. 3 and 4 in a stand pipe at the top of a back flow preventive valve connected with the sewer line, and shows in solid lines the position of the float ball portion of the float switch in a non-floating lowered position when there is no water in the standpipe and the switch contacts thereof are closed, and shows in dashed lines the raised floating position of the float ball where the contacts of the float ball became open.

Refer now to FIG. 1 which illustrates the manner in which the present invention is utilized. The line pairs 4A-4B, 4C-4D, . . . 4S-4T respectively represent branch storm sewer and sanitary sewer lines running under and along various side streets in a given city or town. These various sewer line pairs can extend many blocks in the directions indicated by the arrows there-shown. At each point, the branch storm and sanitary sewer lines along each of a number of side streets join larger branch or main storm and sanitary sewer lines 6 and 10 passing under and along another street extending at right angles thereto.

The backup water control installation of the invention can be installed at various points along the side and main streets of a city or town. They are particularly positioned at least where branch sewer lines join a larger branch or main sewer line. FIG. 1 shows a backup control installation of the invention installed at such points. These backup control installations are respectively indicated in FIG. 1 by blocks 2A-2B, 2C-2D . . . 2S-2T. Each of these installations is made by interrupting a small section of the sewer lines involved and, where necessary, by breaking up a short section of the streets involved and installing the various parts of each installation to be described. While not required in the broadest aspect of the invention, each of the backup control installations 2A, 2B, etc., preferably includes a backflow preventing valve unit which prevents any backup from the downstream side of the valve. Thus, for example, if there are backup problems which develop along the main sewer lines 6 and 10, the backflow preventing valves at the in-feed points along the side streets will close off the side street sewer lines involved to isolate the upstream sides of these valves from flooding problems on the downstream sides of the valves.

The sanitary sewer line 10 discharges its water either directly, or indirectly through other sewer lines, into last sanitary sewer line section 10′ immediately in advance of a sewage treatment plant 8. Between the sewer line 10′ and the input to the sewage treatment plant 8 another flood control installation 2Y is preferably installed. It is designed to handle a much larger volume of water than are the individual backup water control installations 2A, 2B, etc.

The various installations of the invention to be described associated with the sanitary sewer lines enables the sanitary sewer to process all the sewage involved. Heretofore all the sewage in the sanitary sewer lines overloaded with rain water could not be handled by the sewage treatment plant because of the inability of the plant to handle large amounts of storm water which have gained access to the sanitary sewer lines. Therefore, untreated sewage had to be directed from the plant and dumped into lakes or streams to cause undesired pollution thereof.

The storm sewer line 6 in FIG. 1 is shown connected to a last sewer line section 6′ which discharges the storm sewer water into a lake 12.

As previously indicated, each backup control installations 2A, 2B, etc. of the invention provides, among other things, temporary water storage areas in a desired number of storage tanks interconnected at the bottoms thereof to provide a desired temporary water storage capacity for the particular area served thereby. In its most ideal form, the size of the various storage tanks in all the installations can accommodate the rain water from the largest expected rainfalls evenly distributed over the city involved, and where all the backflow valves are assumed to close at about the same time. Cost restrictions could require a lesser number of storage tanks. In any event, the present invention substantially reduces flooding risks.

In addition to the selection of a useful number of storage tanks, the various aspects of the present invention include the unique placement of various water level sensing devices, preferably float switches, manholes, standpipe and backflow preventing valves, and a pump which will operate automatically only when water backup conditions abate. Operators are thus not, needed to run the system. However, in its less preferred form, the invention is operable without backflow preventing valves. The cost of a backup water preventing system of the invention is a small fraction of the cost of other methods heretofore utilized to prevent or minimize water backup problems.

Figures 3, 4, 7:
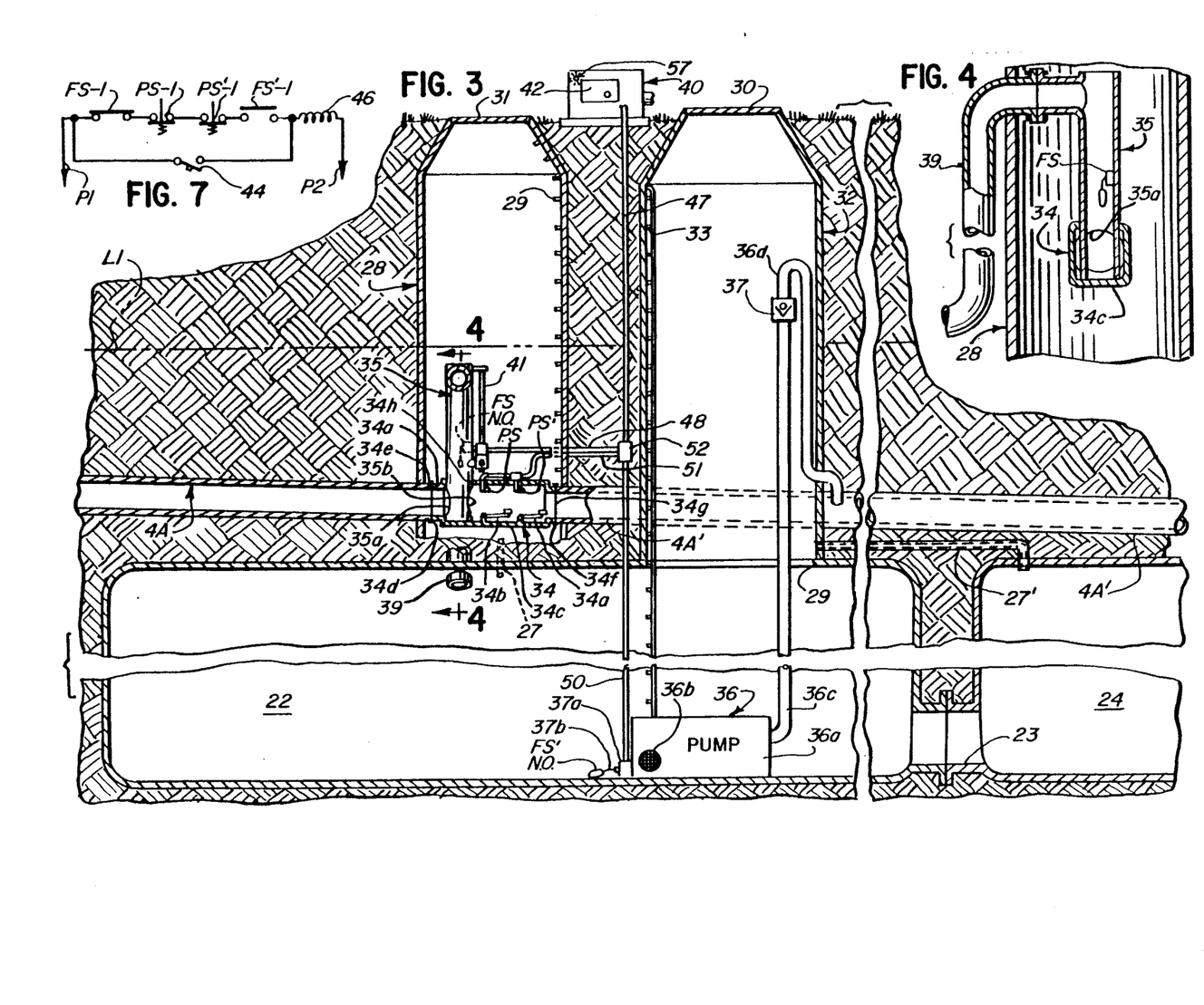
FIG. 3 is a vertical sectional view along a jagged section line 3—3 of FIG. 2, showing the various portions of a backup water control system installed in the storm sewer line shown in FIG. 2 when the system is in dormant state (i.e. when no water is present in the system)
FIG. 4 is a fragmentary, enlarged, vertical sectional view through part of the left manhole shown in FIG. 3, taken along section line 4—4 therein.
FIG. 7 is a circuit diagram of the energizing circuit for a relay which controls the operation of the pump motor in the storage tank, and shows switch contacts of the float ball in the storage tank open and the other float ball contacts closed when the backup water control system is in its dormant mode, and also shows a manually operable switch which bypasses the float ball switch contacts so that the pump can be independently energized from a control panel.

To understand better the basic components which constitute each preferred backup water installation shown by boxes 2A, 2B, etc., in FIG. 1, reference should now be made to FIGS. 2 and 3.

FIG. 2 is a plan view of a street 1. A sanitary sewer line 4B is shown running beneath one side of the street and a storm sewer line 4A is shown running beneath the opposite side of the street. To install a backup water control installation in both of these sewer lines, a section of the street 1 identified by the reference character D is broken up to enable the installation of a storage tank 25 for the sanitary sewer line water and tanks 22 and 24 for storm sewer line water which cannot be accommodated by the sanitary and storm sewer lines. The tanks 22, 24, and 25 are installed end to end below the street, at a depth well below the deepest basement level (L1 FIG. 3) and preferably just below the level of the sewer line involved. These tanks are preferably standard gasoline storage tanks which can have a diameter of from 12 to 14 feet, and a length of about 20 feet. While it may be possible in many cases to place these storage tanks in the easement space available to one side of the street, in most cases these storage tanks would be buried beneath the level of the street involved as indicated in FIG. 2. A connecting pipe 23 extends between the bottom portions of the tanks 22 and 24, as best shown in FIG. 3. Each storage tank used in the present invention must have an air vent which may comprise a pipe 27 or 27′ (see FIG. 3) which extends preferably to the nearest manhole 28 or 32. This is important so as not to build up a back pressure within the upper extremity of these tanks as water rises therein.

FIG. 3 shows a pump 36 resting on the bottom of the storage tank 22. The details of the backup water control system 2B associated with the sanitary sewer line 4B will not be described in detail, it being understood that, except for additional storage tanks, the installation 2B will be substantially identical to the installation 2A for the storm sewer line 4A now to be fully described.

FIG. 2 shows a sanitary sewer line connecting conduit or pipe 16B extending between a dwelling 14 and the sanitary sewer line 4B to the left of a driveway 18. FIG. 2 also shows a storm sewer line connecting conduit or pipe 16A extending between the dwelling 14 and the storm sewer line 4A also at a point to the left of the driveway 18.

Depending upon circumstances, it may or may not be necessary to remove the entire length of the sewer line 4B and/or 4A falling between the section D of the street 1 which has to be removed to install the storage tanks 22, 24, and 25. However, at least a short length of these sewer lines must be removed to permit the installation of a backflow preventing valve unit like valve unit 34 shown FIGS. 3 and 4A. The backflow preventing valve unit 34 could be a conventional backflow preventing valve or a unique one as shown. The unique unit 34 has a pair of float controlled valve cover sections 34a and 34b so that if one section fails to close because of obstructions or other reasons, the other could close under water backup conditions. A conventional backflow preventing valve generally has a single valve cover section. Examples of such single section backflow preventing valves which are useful in the present invention are disclosed in U.S. Pat. Nos. 2,868,380 and 2,928,410. The valve cover sections 34a and 34b are preferably constructed to operate in a manner like that disclosed in these patents where the valve is normally open and closes under back pressure. Other less desirable commercial backflow preventing valves are normally closed and are forced open by forward water pressure. These are also useable in the present invention.

Figures 4A, 11, 12:
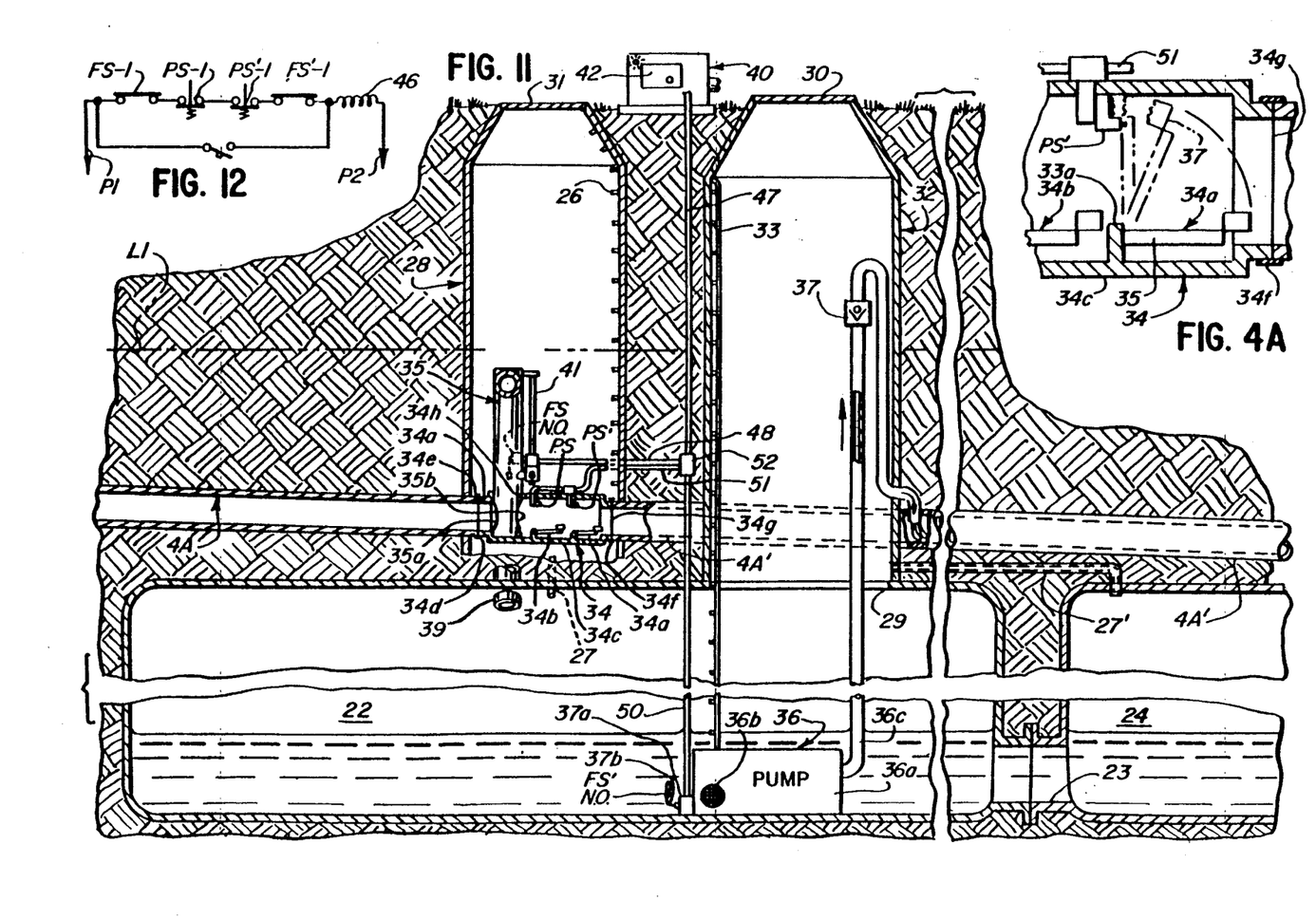
FIG. 4A is an enlarged vertical sectional view through the bottom portion of one of the manholes shown in FIG. 3 which shows more details of the backflow preventing valve found at the bottom of the manhole.
FIG. 11, is a view corresponding to FIG. 3 showing the condition of the various parts of the backup water control system of the invention when it is operating in a tank-emptying mode, which occurs when backflow conditions abate and the storage tanks are automatically emptied.
FIG. 12 is a circuit diagram illustrating the condition of the float ball contacts when the backup water control system is operating in its tank-emptying mode, where all float ball switch contacts are closed to energize the pump in the bottom of one of the storage tanks.

Each valve cover section comprises a valve cover like 34a and an associated compressible float like 37 which is unlike that shown in these patents. As illustrated when there is no water in the valve unit, the valve cover will be in an open position. As water builds up in the valve unit the float 37 rises to pivot the cover gradually into a more closed position where it finally can completely seal off the sewer lines connected to the valve. Thus, when the valve unit is full of water, the cover does not yet fully cover and seal the opening 33a adjacent to it. Water will thus continue to flow through the more restricted opening of the valve. However, when water backup occurs, the back pressure is sufficient to fully close and seal the valve cover around the adjacent opening 33a to close the sewer line.

As disclosed in FIGS. 3 and 4A, the backflow preventing valve unit 34 has a housing 34c having a cylindrical coupling section 34d projecting from one end which abuts a sewer line section 4A. A seal is provided thereat by a suitable sealing means 34e. There is projecting from the opposite end of the housing 34c a similar cylindrical coupling section 34f which is placed in abutment with an adjacent sewer line section 4A'. The point of joinder of the coupling section 34f and the sewer line section 4A' is sealed by sealing means 34g. The sealing means 34e and 34g could be a band of rubber clamped around the juncture line by suitable clamping means (not shown).

One of the unique portions of the present invention is the provision of a water overflow opening in the system. When a backflow preventing valve is used, this opening 34h is preferably placed at the upper end of the valve unit housing 34c. A standpipe 35 having water pass-through openings 35a–35b extends into the opening 34h and rests on the bottom of the valve housing. If no valve unit is used, this opening 34h is placed in the top of the sewer line involved. A float switch unit FS is mounted in this standpipe above the level of sewer line for reasons to be explained. The upper end of the standpipe 35, which preferably extends to a point near but below the basement level line L1, is open and a drain pipe 39 extends from a side of the standpipe near its upper end. Water rising in the standpipe 35 reaching the drain pipe 39 drains into the storage tank 22. Water in the tank 22 will also flow through the connecting pipe sections 23 to the adjacent storage tank 24 so that the water is at the same level in the two tanks 22 and 24. A float switch unit FS' is positioned adjacent the pump 36 on the bottom of the storage tank 26 to operate the pump in a manner to be described.

The entire backflow preventing valve unit 34 is exposed for installation and removal at the bottom of a manhole 28 constructed in the more or less conventional way. A step ladder 22 is mounted on one side of the manhole to permit a service person to climb down to the bottom of the manhole to gain access to the standpipe 35, which is removable from the unit, and to the valve unit 34 which readily fits into the manhole for installation or removal. The top of the manhole 28 is covered by a conventional manhole cover 31.

Access to the pump 36 in the bottom of the storage tank 22 is gained by a preferably larger manhole 32 mounted downstream from the manhole 28. The manhole 32 includes a step ladder 33 to permit the installer to climb down to the bottom of the manhole which terminates at the top surface of the storage tank 22. The step ladder continues down below the manhole 32 where it reaches into the bottom of the tank 22. The storage tank 22 is provided with a large aperture 29 around which the defining walls of the manhole extend. Entry to the manhole 32 is obtained through an opening covered by a manhole cover 30.

The pump 36 has a housing 36a having a water inlet opening 36b and a water outlet pipe 36c which extends up into the manhole 32. The top of the discharge pipe 36c joins the inlet end of a backflow preventing valve unit 37. The backflow preventing valve unit 37 has an outlet pipe 36d which connects to the storm sewer line section 4A' downstream from the backflow preventing valve unit 34, to discharge water from the storage tanks 22 and 24 into the storm sewer line section 4A' when there is no backup conditions in the storm sewer line. The backflow preventing valve unit 37 prevents backflow of water in the storm sewer line section 4A' into the storage tank 22 under backflow conditions.

Mounted on the surface of the ground to one side of the street 1 is shown a standby power supply unit 40. This standby supply unit may be gas operated. AC power is fed to a control panel (not shown) in the housing 40a of the standby power supply unit 40 located behind a locked entry door 42. Whenever AC power to the control panel is interrupted, gas is automatically fed to a gas powered motor generator which will generate the proper AC voltage to operate the electrical portions of the system now to be described. The control panel mounted behind the door 42 includes a manual on-off switch 44 (FIG. 7) which, when closed, will automatically feed AC power to the motor portion of the pump 36, to operate the pump under manual control. The circuit diagram of FIG. 7 shows a pair of power lines P1 and P2 between which is connected the manual on-off switch 44 in series with a pump control relay 46. When the relay is energized, power is fed to the motor portion of the pump 36.

Various electrical conductor-containing conduits 47, 48, 50 and 51 are shown which connect to a junction box 52 (FIG. 3). The conduit 48 extends between float switch unit FS in the standpipe 35 and the junction box 52. A conduit 51 is connected between pressure switches to be described forming part of the backflow preventing valve unit 34 and the junction box 52. A conduit 50 extends between the junction box 52 and the float switch unit FS' adjacent to the pump 36. A conduit 47 extends between the junction box 52 and the control panel installed behind the locked door 42 of the standby power supply unit 40.

To understand the operation of the entire backup water control system, it is necessary first to understand the operation of the float switch unit FS mounted within the standpipe 35, float switch unit FS' mounted adjacent to the pump 36 and pressure switch units PS and PS" operated by the valve unit 34. To this end, reference should now be made to FIGS. 3, 4B, 5, and 6 which show these switch units. As shown in FIGS. 5 and 6, the float switch units FS and FS' comprise housings 37a and 37a' from which extend flexible cords 37b and 37b' connected to float balls 37c and 37c'. Each float ball has a pool of mercury and a pair of contacts as is (not shown) conventional in float switches. The placement of the contacts and the amount of mercury is selected so that the contacts are bridged by the mercury to close the switch formed thereby when the float ball is at a selected elevation.

When there is no water in the storage tank 22, the float ball 37c' is lying on the bottom of the tank, so that the body of mercury therein will not extend between these contacts. When, however, the float ball 37c' floats to any significant extent, the pool of mercury therein will then be oriented so as to interconnect the contacts. The mercury and the two contacts just described are diagrammatically illustrated by the normally-open set of contacts FS'-1 in FIG. 7.

The contacts and pool of mercury within the float ball 37c of float switch FS in the standpipe 35 operate in the opposite way to which the mercury and contacts operate in the float ball 37c' just described. Thus, the float ball 37c when in a lowered position as best shown in FIG. 4B as a normally-closed switch FS-1 shown in FIG. 7. In the lowered position of the float ball 37c, its pair of contacts are covered by the mercury pool. When there is no water in the system, the contacts FS-1 shown in FIG. 7 are thus shown closed. When the float ball 37c in the standpipe begins to float, because backup of water in the storm sewer line causes the water to rise in the standpipe 35, the pool of mercury separates from the contacts therein. Since the contacts FS-1 are connected in series with the storage tank float switch contacts FS'-1 which are open when the storage tanks are empty, the pump 36 cannot be automatically energized when there is no water in the standpipe or storage tank. This condition is sometimes referred to as the dormant mode of operation of the backup water control system of the present invention.

When the system does not include the backup preventing valve unit 34, or the valve unit 34 once installed is removed for some reason, the standpipe float switch FS operating with the float switch FS' in the tank 22 will control the system properly if the control panel terminals to be connected to the conductors leading from the valve switches PS and PS' to be described are shunted. In such case, the valve unit 34 is replaced by a sewer line section with an overflow opening in the top thereof. The standpipe 35 is then dropped into this opening as it was dropped into the overflow opening of the valve unit 34.

The presence of the backflow preventing valve unit 34 can create a problem in the possible circumstances where there is a continuing backflow condition downstream from the backflow preventing valve 34 which closes the valve and rain has ceased on the upstream side thereof. In such case, the water drains from the standpipe 35 so that float switch FS-1 in the standpipe is closed. If there is water in the storage tanks 22, 24 float switch FS'-1 is closed. If the pump 36 is then energized, the pump would be working but water could not be pumped into the full sewer line 4A'. It is then desirable to prevent the unnecessary energization of the pump 36 when there is no water in the standpipe 35 and there is still some water in the tank 22 to be pumped out.

To avoid this problem, normally-closed pressure switches PS and PS' are respectfully associated with backflow valve cover sections 34a and 34b so that if either one of these cover sections operates to close off the sewer system, the associated pressure switch contacts will open to prevent energization of the pump 36. These pressure switch contacts are shown as contacts PS-1 and PS'-1 in FIG. 7 connected in series with the float switch contacts FS-1 and FS-1'. Thus, whenever a backflow condition exists which causes the backflow preventing valve cover sections 34a or 34b to close off the sewer line, either the switch PS-1 or PS-1' will open to prevent the energization of the pump operating relay 46.

Figures 8, 9, 10:
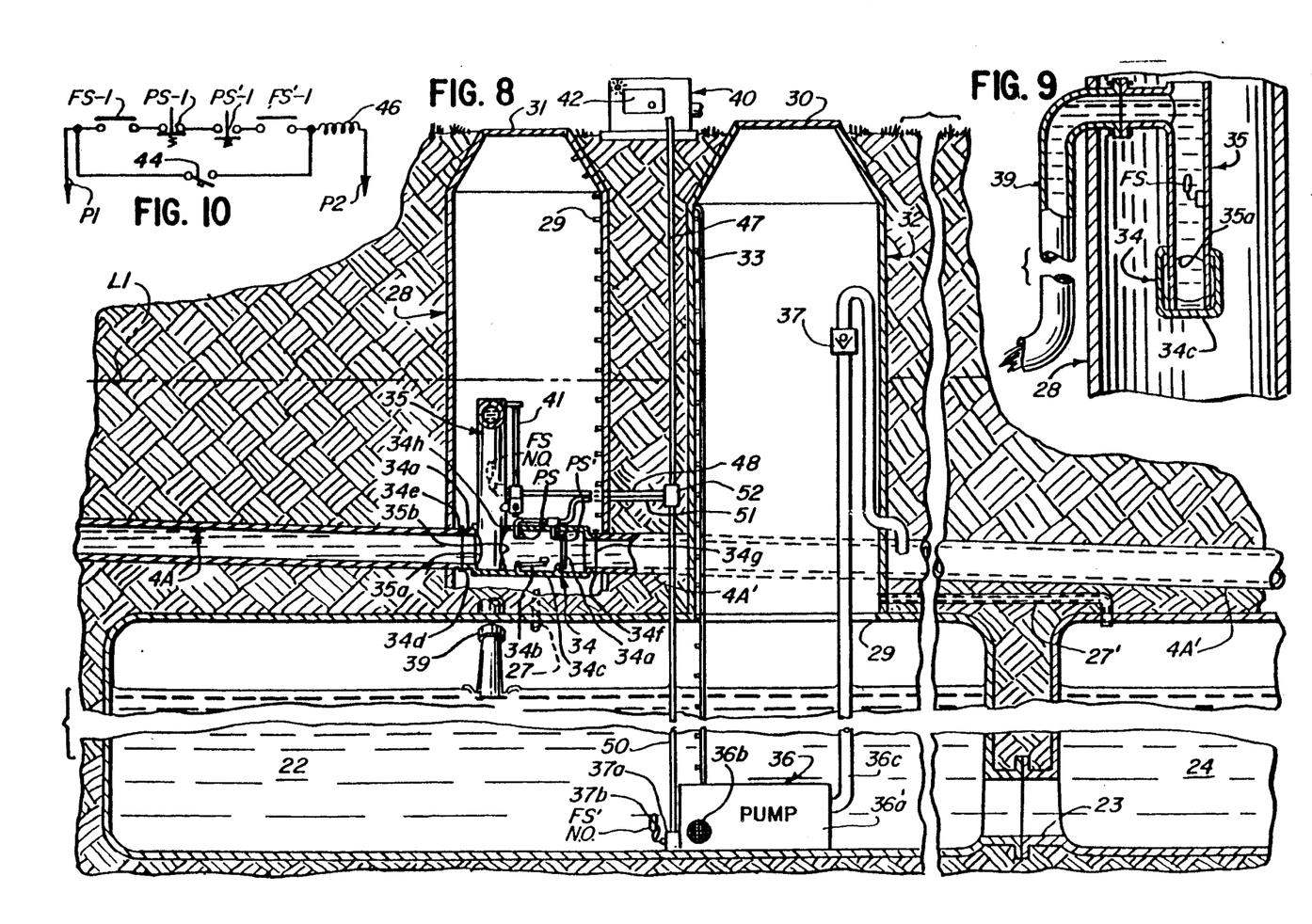
FIG. 8 is a view corresponding to FIG. 3 showing the condition of the various parts of the backup water control system of the invention, when the system is in its backflow mode of operation when the sewer line cannot handle the rain water involved, and the rain water overflows the standpipe and drains into the storage tanks.
FIG. 9 is a view corresponding to FIG. 4 which shows the position of the float ball in the standpipe during the back flow mode of operation of the system.
FIG. 10 is a circuit diagram corresponding to FIG. 7 showing the modified condition of the float ball switch contacts when the backup water control system is in its backflow mode of operation where the pump is still not energized.

The water backup preventing system described has three modes of operation. FIG. 3, 4, and 7 show the condition of the system in the dormant mode when no water is flowing in the system. FIGS. 8–10 show the condition of the system in its backup preventing mode where the rate of water flowing into the sewer line exceeds the capacity of the sewer lines. FIGS. 11 and 12 show the condition of the system in its storage tank emptying mode.

In accordance with one of the specific features of the invention, as best shown in FIG. 4B, the standpipe 35 is provided with a backflow condition indicating tube 41 defining a chamber secured in any way to the outside of the standpipe. This tube 41 is mounted in a fitting 43 which has a horizontally extending inlet tube 43a suitably secured within an opening 35c in the standpipe immediately above the top of the backflow preventing valve housing 34c. The inlet tube 43a has an entry passageway 43a' communicating with a vertical passageway 43b in the fitting. Any suitable one-way valve 43c is placed in the path of flow of water through the inlet passageway 43a' and the passageway 43b so that water can only flow upwardly into the tube 41, unless a water draining pushbutton 45 is depressed. The pushbutton has a pin 45a which pushes a ball 43c, of this valve up to remove the ball from a ball seat 43c".

Whenever there is a backup condition in the system causing the backflow preventing valve unit 34 to close the sewer line section involved, further buildup of water behind the closed valve will, as previously indicated, cause water to flow upwardly into the standpipe 35. Water will also rise in the backflow indicating tube 41 to the same level as the water will be in the standpipe 35. When backflow conditions subside, the water will drain from the standpipe 35, but the water will remain in the backflow indicating tube 41 as a record of the fact that backflow conditions occurred in the system. This record is kept even though the water doesn't rise high enough in the standpipe 35 to flow through the drain pipe 39 into the storage tank 22.

Indicating means is preferably provided to alert persons at ground level that a backflow condition has occurred. To this end, a pair of contacts 47' project into the fitting 43 above the one-way valve 43c. When water covers these two contacts, it places a sufficiently small resistance between these contacts to either directly, or indirectly as through a current amplifier, effect the energization of a relay 53 mounted on the control panel within the standby power supply unit 40. FIG. 4B shows a conductor 49 connected to one end of a relay 53 whose other end is connected to power line P1. Another line 49' is shown extending to the power line P2. When water covers contacts 47' conductors 49—49' are effectively shorted to energize relay 53. The relay 53 has a pair of normally-open contacts 53-1 connected in series with an indicating means, such as an LED or incandescent lamp 57, between the power lines P1-P2. Accordingly, the light indicating means 57 will be energized when water covers the contacts 47 in the fitting 43. The light indicating means 57 is preferably mounted to be visible on the outside of the housing of the standby power supply unit 40 (FIG. 3). If desired, the tube 41 can be provided with a plurality of pairs of contacts (not shown) at different elevations in the tube 41, and individual indicating means controlled as described for means 57 and visible on the outside of the housing of the standby power supply unit 40 indicates the level of the water in the tube 41. After a rainstorm, an employee of the sewer department of the town or city involved can drive by all of the standby power supply units of the city to see where a backflow condition had occurred in the town or city involved during the previous rainstorm. When he spots such a condition as indicated by energized indicating means 57, he enters the manhole 28 nearby to examine the level of the water in the indicating tube 41 to see the degree of backup which had occurred. He resets the backflow indicating means by depressing the pushbutton 45 which empties the tube 41.

It is also envisioned that the level of the water in tube 41 would be indicated by a radio telemetry system which provides at a central location in the city involved the liquid level conditions in all of the tubes 41 for all the backflow preventing installations in that city.

It should be apparent that the particular backup water control installations described provide an effective means for monitoring and automatically minimizing backup flood conditions in any given area in which the invention is installed.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention in appropriate instances even the specific claims involved should be construed in light of the doctrine of equivalents.

In the claims to follow, the term "storage tank" is used in a broad sense to encompass both individually movable structures commonly referred to as tanks or much larger structures which are immobile and serve as large water storage reservoirs.

I claim:

1. A water backup monitoring system for a ground buried sewer line, the sewer line being provided at a given point therealong with at least one overflow opening into which opening water which cannot be handled by the sewer line will rise and overflow, a manhole extending between said sewer line and the surface and surrounding said overflow opening to permit a man to gain access to the area of said overflow opening, a standpipe in said manhole communicating with said overflow opening, into which standpipe water rises when backflow conditions exist in the sewer line, a backflow indicating tube on the outside of the standpipe and into which backflow indicating tube water flows from said overflow opening so that the water in the backflow indicating tube and the standpipe are at the same level, said tube providing an indication of the level of the water therein, and a one-way valve means in said tube which permits water to rise in said tube to prevent such water from draining therefrom, so that when overflow conditions abate and water drains from said standpipe a permanent record remains in said tube of the level to which the water rose in said standpipe.

2. The monitoring system of claim 1 wherein alarm means are provided above ground level for indicating to a person above ground level that backflow conditions have occurred at the location involved, and manually operable means for draining water in said backflow indicating tube to reset the system to indicate a new backup condition developing in the sewer line.

3. A water backup monitoring system for a ground buried sewer line, the sewer line being provided at a given point therealong with at least one overflow opening into which opening water which cannot be handled by the sewer line will rise and overflow, a backflow chamber disposed above and communicating with said overflow opening, into which chamber water rises when backflow conditions exist in the sewer line, means for providing an indication of the level of the water in said chamber, and a one-way valve means for permitting water to rise in said chamber and for preventing such water from draining therefrom, so that when overflow conditions abate a permanent record remains in said chamber of the level to which the water rose.

4. The monitoring system of claim 3 wherein at least a portion of said chamber is transparent to provide a visible indication of the level of water therein.

5. The monitoring system of claim 4 wherein said chamber is a generally vertically oriented tube.

6. The monitoring system of claim 3 including reset means for draining water from said chamber to reset the system to indicate a later backup condition developing in the sewer line.

* * * * *